United States Patent
Richards

(10) Patent No.: US 8,920,283 B2
(45) Date of Patent: Dec. 30, 2014

(54) OIL SCAVENGE ARRANGEMENT

(71) Applicant: Rolls-Royce PLC, London (GB)

(72) Inventor: Martyn Richards, Burton Trent (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 13/902,050

(22) Filed: May 24, 2013

(65) Prior Publication Data
US 2013/0331222 A1    Dec. 12, 2013

(30) Foreign Application Priority Data
Jun. 8, 2012   (GB) .................................. 1210146.5

(51) Int. Cl.
| | |
|---|---|
| F16H 1/28 | (2006.01) |
| F02C 3/107 | (2006.01) |
| F16H 57/04 | (2010.01) |
| F01D 25/18 | (2006.01) |
| F02C 7/36 | (2006.01) |
| F01D 25/28 | (2006.01) |
| F16H 57/08 | (2006.01) |

(52) U.S. Cl.
CPC ...... *F16H 1/28* (2013.01); *F02C 3/107* (2013.01); *F16H 57/0486* (2013.01); *F05D 2260/40311* (2013.01); *F01D 25/18* (2013.01); *F16H 57/082* (2013.01); *F02C 7/36* (2013.01); *F16H 57/0409* (2013.01); *F01D 25/28* (2013.01); *F16H 57/0427* (2013.01)
USPC ........................................................ 475/331

(58) Field of Classification Search
CPC ... F16H 1/28; F16H 57/0428; F16H 57/0457; F16H 57/0482; F16H 57/082
USPC ....................................................... 475/159, 331
See application file for complete search history.

(56) References Cited

U.S. PATENT DOCUMENTS

| | | | |
|---|---|---|---|
| 3,939,736 A | 2/1976 | Morin | |
| 5,669,844 A | 9/1997 | Homan et al. | |
| 6,223,616 B1* | 5/2001 | Sheridan | .......................... 74/468 |
| 2001/0005703 A1* | 6/2001 | Iwata | ............................. 475/159 |

(Continued)

FOREIGN PATENT DOCUMENTS

| | | |
|---|---|---|
| DE | 34 10 977 A1 | 9/1985 |
| EP | 1 890 054 A1 | 2/2008 |
| EP | 1 925 855 A2 | 5/2008 |
| WO | WO 2012/014634 A1 | 2/2012 |

OTHER PUBLICATIONS

Jul. 18, 2013 European Search Report issued in European Patent Application No. EP 13 16 8919.

(Continued)

*Primary Examiner* — Edwin A Young
(74) *Attorney, Agent, or Firm* — Oliff PLC

(57) ABSTRACT

An epicyclic gearbox oil scavenge arrangement. The epicyclic gearbox is of the planetary or differential type and comprises an input sun gear (28); a plurality of planet gears (32) that mesh with the sun gear (28) and are driven therefrom; an annular planet carrier (34) that couples the planet gears (32) in known relative orientation and is configured to precess around the sun gear (28); and a ring gear (38) that meshes with each planet gear (32). The ring gear (38) comprises ejection apertures (44) that extend radially therethrough and the planet carrier (34) comprises at least one lobe (42) that extends radially from the periphery of the planet carrier.

17 Claims, 4 Drawing Sheets

(56) References Cited

U.S. PATENT DOCUMENTS

2010/0113205 A1    5/2010  Lasko et al.
2010/0180721 A1*   7/2010  Quehenberger ............ 74/606 R
2010/0236347 A1    9/2010  Kuwamoto et al.
2011/0172048 A1*   7/2011  Nishida et al. ................ 475/159

OTHER PUBLICATIONS

Search Report issued in British Application No. 1210146.5 dated Sep. 30, 2012.

* cited by examiner

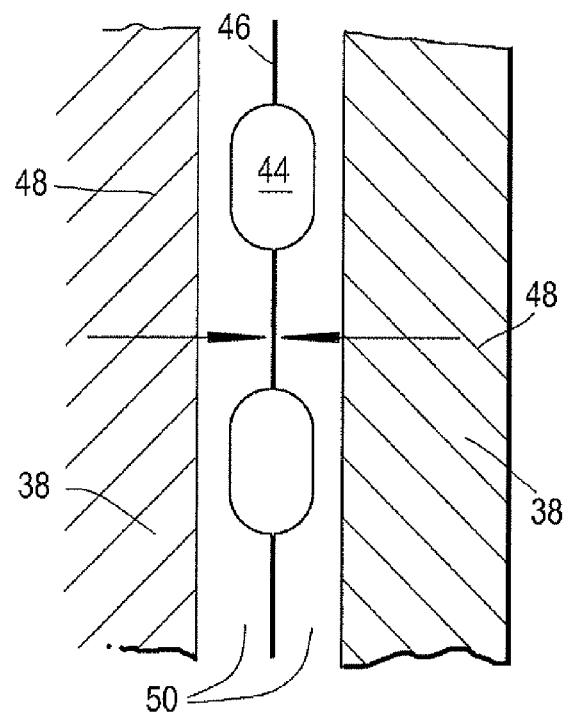
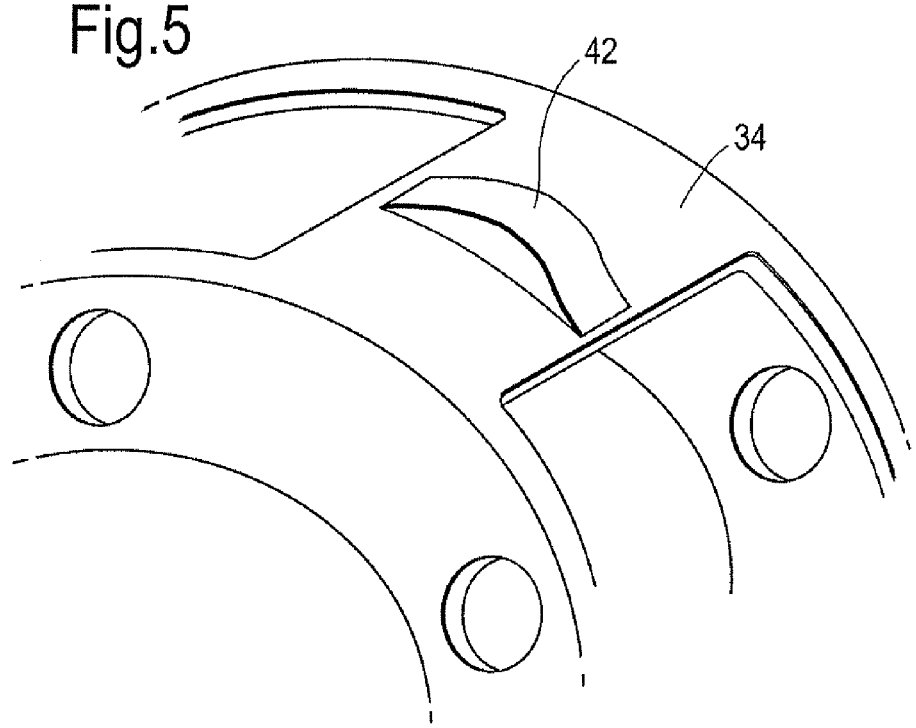

OIL SCAVENGE ARRANGEMENT

The present invention relates to an oil scavenge arrangement for an epicyclic gearbox. It finds particular utility for a planetary arrangement of epicyclic gearbox in which the sun gear is coupled to an input shaft, and the planet carrier precesses around the sun gear and is coupled to an output shaft.

It is known to lubricate and cool an epicyclic gearbox by introducing oil. In use the oil gets worked which raises its temperature and may also attract debris. It is therefore necessary to eject the oil and replace it with fresh oil regularly to prevent or reduce the risk of overheating and hydraulic lock.

It is known to eject oil from a star arrangement epicyclic gearbox, in which the planet carrier is fixed and the ring gear is coupled to an output shaft and precesses around input sun gear. Typically the rotation of the ring gear generates sufficient centrifugal force to eject the oil from the gearbox.

It is beneficial to use a planetary arrangement of epicyclic gearbox in applications in which a large gear ratio is desirable but where weight and/or size of the gearbox is constrained. Disadvantageously, a planetary arrangement epicyclic gearbox does not have the centrifugal force to eject the oil because the ring gear does not rotate.

The present invention provides an oil scavenge arrangement for an epicyclic gearbox, particularly a planetary arrangement epicyclic gearbox, that seeks to address the aforementioned problems.

Accordingly the present invention provides an epicyclic gearbox oil scavenge arrangement comprising: an input sun gear; a plurality of planet gears that mesh with the sun gear and are driven therefrom; an annular planet carrier that couples the planet gears in known relative orientation and is configured to precess around the sun gear; a ring gear that meshes with each planet gear; characterised in that the ring gear comprises ejection apertures that extend radially therethrough; and the planet carrier comprises at least one lobe extending radially.

Advantageously the combination of the at least one lobe and the ejection apertures enables oil (or another fluid) to be ejected from the gearbox before it is overly worked. This reduces the risks of overheating, hydraulic lock and transferring debris into the gear mechanism.

The lobes extend radially from the peripheral surface of the planet carrier. The lobes may be profiled circumferentially. Additionally or alternatively the lobes may be profiled axially. The profiling enables the shape of the lobes to be optimised to eject oil from a gearbox for a particular application of the present invention. The profiling may, for example, comprise a non-symmetrical shape in cross-section or a channel in the surface of the lobe to channel oil more effectively.

The ejection apertures may be equi-angularly spaced about the periphery of the ring gear or may be irregularly spaced. For example, the ejection apertures may be more densely spaced close to the top of a stationary ring gear and more loosely spaced close to the bottom of a stationary ring gear where gravity assists ejection. The ejection apertures may be spaced such that an oil ejection pulse through one aperture is not prone to returning to the gearbox through a subsequent aperture in the direction of rotation of the planet carrier. The ejection apertures may comprise features, such as a lip or rim, to further prevent ingress of oil following an ejection pulse.

The ring gear may form a double helical gear, in which advantageously the end loads are balanced. Alternatively the ring gear may form a spur gear, for use in a turboprop gas turbine engine or other application. The ring gear may be formed in two portions which are arranged to abut axially, and the at least one lobe may be arranged to run in a trough formed between the two portions. Thus at least some of the at least one lobe is closely surrounded on three sides by the parts of the ring gear forming the trough. A running clearance spaces the at least one lobe from the ring gear on each side.

The ring gear may be stationary, in a planetary epicyclic gearbox arrangement. Alternatively the ring gear may precess in the opposite sense to the planet carrier, in a differential gearbox arrangement. Generally the ring gear precesses much more slowly than the other gears and so there is insufficient centrifugal force generated to expel or eject oil from the gearbox without using the oil scavenge arrangement of the present invention.

The ejection apertures may be profiled to have cross-section that is one of the group comprising circular, square, elongate, triangular and trapezoidal. Alternatively the ejection apertures may be profiled to have a different cross-sectional shape. The ejection apertures may comprise radiused corners. Advantageously, ejection apertures located at different positions around the periphery of the ring gear may comprise different cross-sectional shapes to optimise fluid ejection therethrough.

There may be at least three planet gears. The number of lobes may be equal to the number of planet gears. Alternatively there may be more lobes than planet gears or fewer. Each lobe may be positioned between a pair of adjacent planet gears or more than one lobe may be positioned between a pair of adjacent planet gears. There may not be one or more lobes positioned between every pair of adjacent planet gears.

The lobes may be integrally formed with the planet carrier or may be formed separately and subsequently attached to the periphery of the planet carrier, by bonding, mechanical fixing or any other method.

The planet carrier may be coupled to an output shaft. The ring gear may additionally be coupled to a second output shaft, when it processes.

The present invention also provides a gas turbine engine comprising a gearbox oil scavenge arrangement as described and a propeller gas turbine engine comprising a gearbox oil scavenge arrangement as described.

Any combination of the optional features is encompassed within the scope of the invention except where mutually exclusive.

The present invention will be more fully described by way of example with reference to the accompanying drawings, in which:

FIG. 4 is a partial schematic view of the ring gear in a radial direction.

FIG. 5 is a partial perspective view of the planet carrier.

Figure 1:
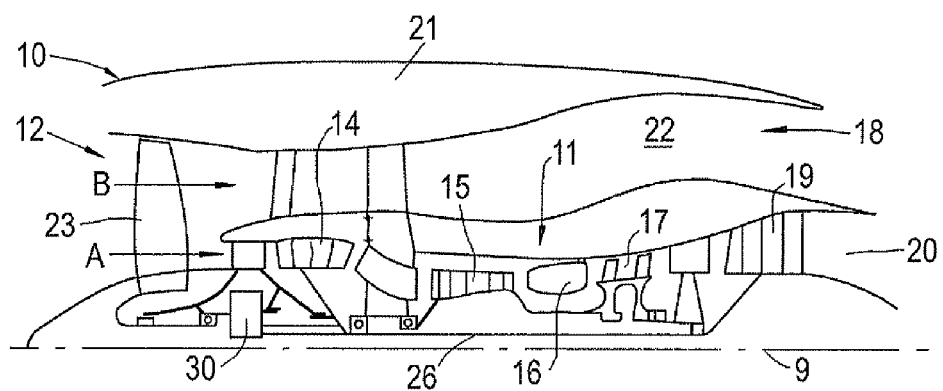
FIG. 1 is a sectional side view of a gas turbine engine having a geared fan.

Referring to FIG. 1, a two-shaft gas turbine engine 10 has a principal rotational axis 9. The engine 10 comprises an air intake 12 and a propulsive fan 23 that generates two airflows A and B. The gas turbine engine 10 comprises a core engine 11 having, in axial flow A, a low pressure booster compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines, in axial flow B, a bypass duct 22 and a bypass exhaust nozzle 18. The fan 23 is attached to and driven by the low pressure turbine 19 via shaft 26 and epicyclic gearbox 30.

The gas turbine engine 10 works in a conventional manner so that air in the core airflow A is accelerated and compressed by the high pressure booster compressor 14 and directed into the high pressure compressor 15 where further compression takes place. The compressed air exhausted from the high pressure compressor 15 is directed into the combustion equipment 16 where it is mixed with fuel and the mixture combusted. The resultant hot combustion products then expand through, and thereby drive the high pressure and low pressure turbines 17, 19 before being exhausted through the nozzle 20 to provide some propulsive thrust. The high pressure turbine 17 drives the high pressure compressor 15 by a suitable interconnecting shaft. The fan 23 normally provides the majority of the propulsive thrust. The epicyclic gearbox 30 is a reduction gearbox.

Figure 2:
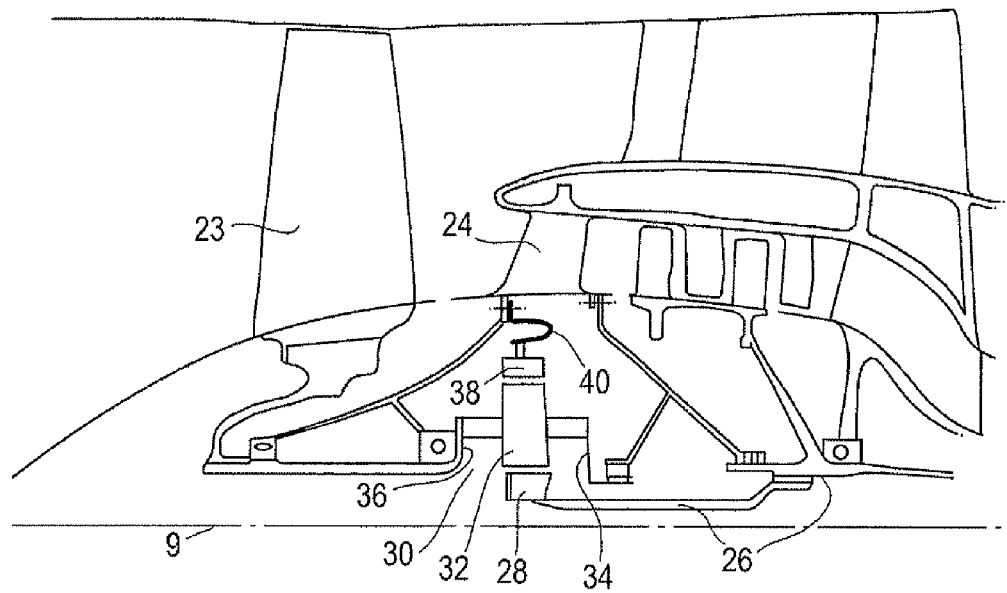
FIG. 2 is an enlargement of a planetary arrangement epicyclic gearbox used in the gas turbine engine of FIG. 1.

A known mechanical arrangement for a two-shaft geared fan gas turbine engine 10 is shown in FIG. 2. The low pressure turbine 19 drives the shaft 26, which is coupled to a sun wheel, or sun gear, 28 of the epicyclic gear arrangement 30. Radially outwardly of the sun gear 28 and intermeshing therewith, in conventional manner, is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis independently. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to stationary structure 24.

The epicyclic gearbox 30 is of the planetary type, in that the planet carrier 34 rotates about the sun gear 28 and is coupled to an output shaft, linkages 36. In other applications the gearbox 30 may be a differential gearbox in which the ring gear 38 also rotates in the opposite sense and is coupled to a different output shaft via linkages 40.

An epicyclic gearbox 30 must be lubricated, by oil or another fluid. However, the oil becomes heated by being worked during operation of the epicyclic gearbox 30. In addition, the oil may accumulate within the epicyclic gearbox 30, particularly at the bottom of the stationary ring gear 38 under the influence of gravity, to the extent that causes hydraulic lock. Furthermore, the oil may accumulate particulate debris from the components of the epicyclic gearbox 30 which may cause seizing or other problems. It is therefore necessary to eject the oil efficiently from the epicyclic gearbox 30 to allow its replacement by spraying in fresh, cool oil. Ejection of the oil, particularly when it is collected for cleaning before being returned to the reservoir from which fresh oil is supplied, is referred to as oil scavenge. The present invention is particularly concerned with an oil scavenge arrangement for an epicyclic gearbox 30 with a stationary ring gear 38 but may also find utility where the ring gear 38 rotates relatively slowly, for example in the differential gearbox of a contra-rotating propeller gas turbine engine.

Figure 3:
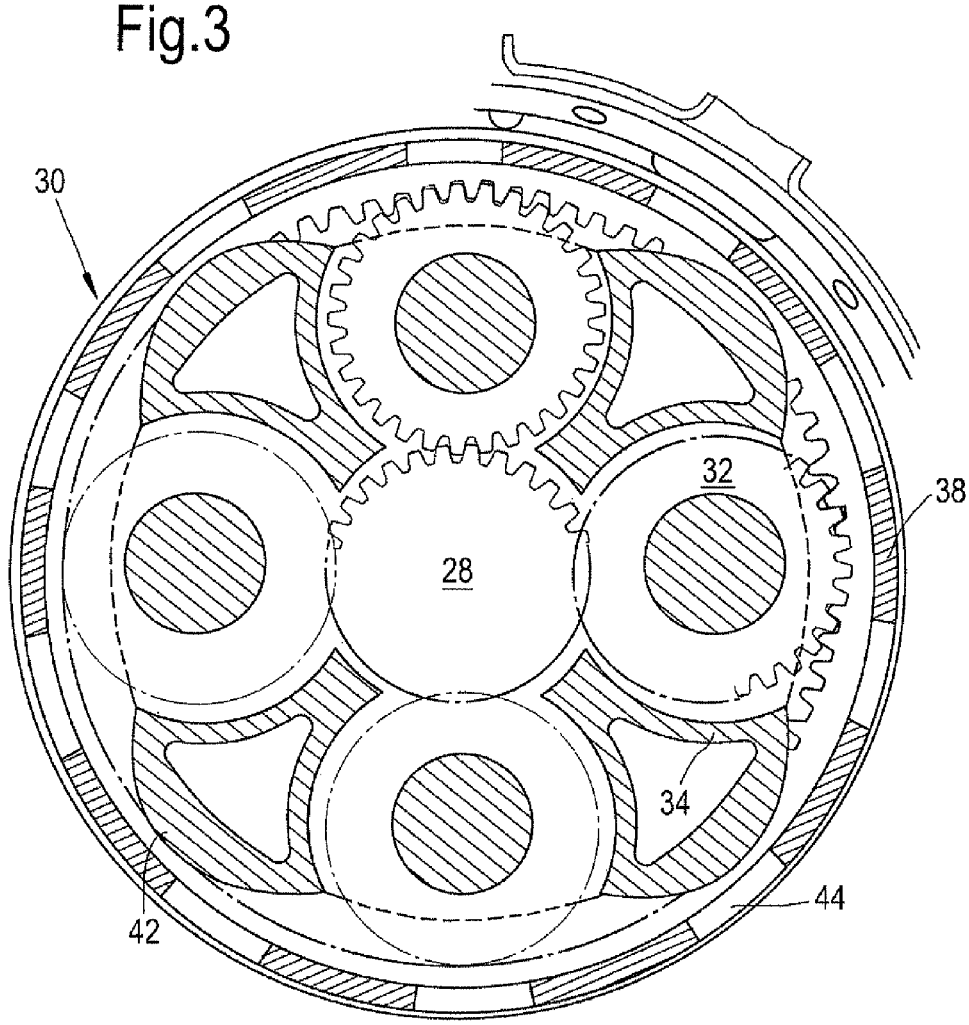
FIG. 3 is a schematic section through the planet carrier of an epicyclic gearbox according to the present invention.

An exemplary embodiment of the present invention is shown in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The planet carrier 34 of the present invention has a modified shape relative to known arrangements to assist in pumping oil out of the epicyclic gearbox 30. The planet carrier 34 is generally circular or annular and has a diameter that is sufficient to couple to the centre of each of the planet gears 32. The planet carrier 34 comprises at least one lobe 42 which extends radially so that the peripheral surface of the planet carrier 34 is at different radius at different angular positions. In the illustrated arrangement there are four lobes 42, each of which is located between an adjacent pair of planet gears 32. However, there may be more than one lobe 42 between each pair of planet gears 32 or there may not be a lobe 42 between every pair of planet gears 32 but only between some pairs or there may be one or more lobes 42 aligned with the planet gears 32. The lobes 42 have sufficient radial extent that they protrude radially beyond the teeth of the planet gears 32.

The ring gear 38 of the present invention also has a modified shape relative to known arrangements. The ring gear 38 is annular and comprises at least one ejection aperture 44 which extends radially through the ring gear 38. Preferably there is a plurality of ejection apertures 44 spaced about the periphery of the ring gear 38. The ejection apertures 44 may have any suitable profile perpendicular to the radial direction. For example, the ejection apertures 44 may be circular, elongate, elliptical, square, rectangular, trapezoidal or any other two-dimensional geometrical shape. An exemplary profile of the ejection apertures 44 is shown in FIG. 4 in which two ejection apertures 44 are illustrated being elongate with radiused corners.

The ejection apertures 44 may extend through the ring gear 38 at an angle to the radial direction, thus with a component in the radial direction and a component in the circumferential direction and/or a component in the axial direction. The profile of the ejection apertures 44 may change between the radially inner and radially outer sides of the ring gear 38. The ejection apertures 44 may have a straight axis through the ring gear 38 or may curve between the radially inner and radially outer sides, thus having an increasing or decreasing component in the circumferential direction between the radially inner and radially outer sides of the ring gear 38. Although it is probable that all the ejection apertures 44 in a specific ring gear 38 will have the same profile and the same three-dimensional shape, this is not essential. In some applications, therefore, at least one of a plurality of ejection apertures 44 will have a different profile and/or three-dimensional shape to at least one other of the plurality of ejection apertures 44.

The number and distribution of ejection apertures 44 around the periphery of the ring gear 38 is dependent on the application of the present invention and the number of lobes 42 provided on the planet carrier 34. Preferably there are at least as many ejection apertures 44 as there are lobes 42. There may be significantly more ejection apertures 44 than lobes 42; for example, in FIG. 3 there are four lobes 42 and ten ejection apertures 44 illustrated. The ejection apertures 44 may be equally spaced around the ring gear 38. Alternatively, they may be unequally spaced. For example, it may be beneficial to increase the density of ejection apertures 44 near the top of a stationary ring gear 38 where gravity does not assist ejection of oil and to decrease the density near the bottom of such a ring gear 38 because gravity assists ejection of oil from these locations.

The ring gear 38 may comprise shaping or features on its radially outer surface about each ejection aperture 44 to assist direction of the ejected oil and prevent the oil draining back through the same or another ejection aperture 44 and into the gears of the epicyclic gearbox 30. For example, there may be a lip or collar around each ejection aperture 44. This may be particularly beneficial since the oil will be ejected in pulses, as each lobe 42 passes an ejection aperture 44, and so there may be gaps in the radially outward flow of oil. It is important that the flow of oil is not able to reverse and thus re-enter the gearbox 30 during these gaps.

Advantageously, the lobes 42 on the planet carrier 34 and the arrangement of ejection apertures 44 through the ring gear 38 results in worked oil being ejected from the epicyclic gearbox 30 as the planet carrier 34 precesses around the input sun gear 28 so that the risks from overheating and hydraulic locking are reduced. Fresh oil, which will be cooler than worked oil, can be sprayed into the arrangement to replace that which is ejected so that an approximately constant quantity of oil is present that is sufficient to lubricate the components as required.

In an illustrated embodiment of the present invention, the ring gear 38 comprises two axial portions that are mirror images of each other and abut in the axial plane to form the ring gear 38. This can be seen in FIG. 4 in which the two portions of the ring gear 38 abut at an abutment line 46. Each portion comprises helical gear teeth 48 that intermesh with the teeth of the planet gears 32 and a trough 50 between the helical gear teeth 48 and the abutment line 46. The trough 50 comprises cut out parts which, when the two portions of the ring gear 38 abut, form the ejection apertures 44. The troughs 50 on each portion of the ring gear 38 are axially spaced apart wide enough that the planet carrier 34, or at least the lobes 42, fits between the helical gear teeth 48. Thus the lobes 42 run within the trough 50 defined between the portions of the ring gear 38. It is beneficial to form the ring gear 38 in two axial portions to aid assembly of the epicyclic gearbox 30. Optionally the two portions of the ring gear 38 may be bonded or otherwise securely coupled together instead of simply abutting together. Abutting is secure because the meshing of the helical gear teeth 48 with the teeth of the planet gears 32 forces the two portions of the ring gear 38 into axial abutment. The troughs 50 may be necessary to enable efficient manufacture of the helical gear teeth 48, for example to accommodate cutting angles when forming the teeth. Alternatively the ring gear 38 and planet gears 32 may be arranged to direct oil axially away from the trough 50, in which case two or more axially spaced arrays of ejection apertures 44 may be provided to receive the ejected oil.

Figure 6:
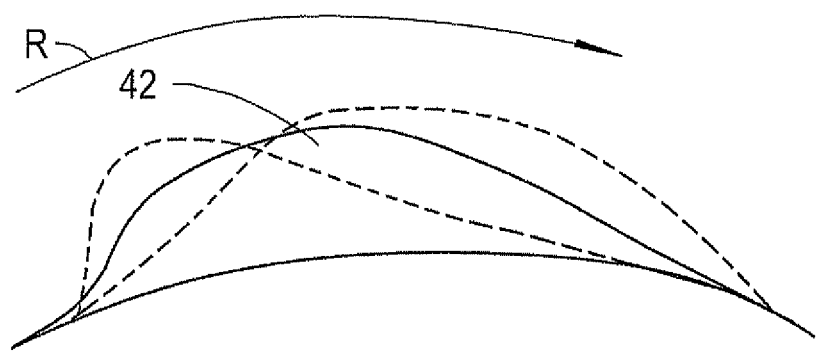
FIG. 6 is a partial schematic view of lobes in an axial direction.
Figure 7:
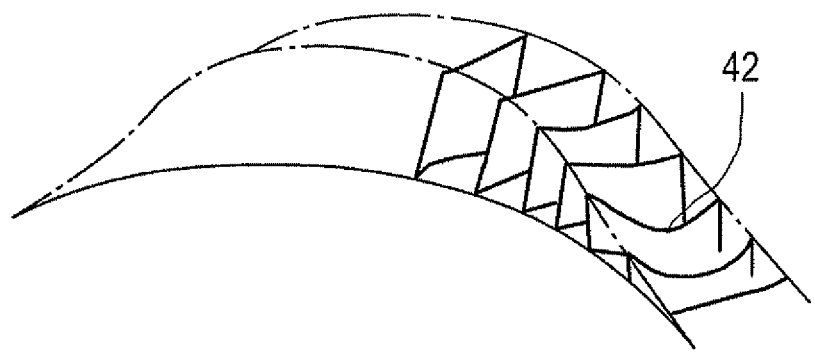
FIG. 7 is a partial perspective view of a lobe.

FIG. 5 is a close up perspective view of one embodiment of a lobe 42 on the planet carrier 34. The lobe 42 may be shaped and profiled to maximise efficient ejection of oil towards the ejection apertures 44 in the ring gear 38. FIG. 6 and FIG. 7 illustrate alternative profiles of the lobe 42 wherein the lobes 42 are profiled circumferentially, axially or in both directions. In FIG. 6 three different circumferential profiles are shown in cross-section, one of which is shaped like a normal distribution curve, one which has greater radial extent at the first part of the lobe 42 to meet the oil when the planet carrier 34 rotates and one which has greater radial extent at the last part of the lobe 42 to meet the oil when the planet carrier 34 rotates. FIG. 7 illustrates one embodiment of surface profiling of the lobe 42 wherein the peripheral surface of the lobe 42 is scalloped or scooped at the portion that meets the oil first when the planet carrier 34 is rotating. The lobe 42 is thus profiled in the axial direction and may also be profiled in the circumferential direction (not shown). The scallop or scoop shape acts to funnel the oil up the peripheral surface of the lobe 42 to the greatest radial extent so that more of the oil is channelled to be ejected through the ejection apertures 44 in the ring gear 38 and less is spilled axially past the lobe 42. Advantageously this results in more of the oil being ejected and replaced by fresh oil.

The planet carrier 34 may comprise apertures in the annular portion, particularly radially aligned with the lobes 42, to lighten the planet carrier 34 and thus the whole epicyclic gearbox 30. Similarly other components of the epicyclic gearbox 30 may comprise apertures to lighten the components.

The ring gear 38 has been described with helical gear teeth 48. However, the ring gear 38 may be a spur gear, having teeth extending parallel to the axis of the ring gear 38, with a trough 50 running circumferentially between axially front and rear portions. Long spur gears which will obtain the benefit of the present invention are relevant to gears for turboprop gas turbine engines. Although it is generally preferable that the trough 50 is axially central for the helical gear teeth 48 arrangement, since the end loads are thereby balanced, the benefits of the invention are also realised with a trough 50 that is not axially central between the front and rear edges of the ring gear 38.

Although the epicyclic gearbox oil scavenge arrangement of the present invention has been described with reference to a planetary epicyclic gearbox 30 for a geared fan gas turbine engine 10, it finds utility in other applications. For example, it may be used for a gas turbine engine 10 with a single propeller driven from the planet carrier 34; or it may be used for another type of engine driving a single propeller such as a helicopter, turboprop, wind turbine or tidal turbine. The oil scavenge arrangement may be used in an accessory gearbox. Alternatively the oil scavenge arrangement may be used in a differential gearbox for a contra-rotating propeller gas turbine engine or other application. Alternatively the oil scavenge arrangement may be used in an epicyclic gearbox 30 used in another type of machinery incorporating a high speed gearbox which will naturally indicate use of a double helical tooth arrangement. The invention finds particular utility where the design of the gears gives the potential or tendency for oil to pool in greater quantities than can be dispersed by gravity.

The invention claimed is:

1. An epicyclic gearbox oil scavenge arrangement comprising:
    an input sun gear;
    a plurality of planet gears that mesh with the sun gear and are driven therefrom;
    an annular planet carrier that couples the planet gears in known relative orientation and is configured to precess around the sun gear;
    a ring gear that meshes with each planet gear; wherein
    the ring gear comprises ejection apertures that extend radially there through;
    and the planet carrier comprises at least one lobe extending radially.

2. A gearbox as claimed in claim 1 wherein the lobes are profiled circumferentially.

3. A gearbox as claimed in claim 1 wherein the lobes are profiled axially.

4. A gearbox as claimed in claim 1 wherein the ejection apertures are equi-angularly spaced about the periphery of the ring gear.

5. A gearbox as claimed in claim 1 wherein the ejection apertures are irregularly spaced about the periphery of the ring gear.

6. A gearbox as claimed in claim 1 wherein
    the ring gear forms a double helical gear.

7. A gearbox as claimed in claim 1 wherein
the ring gear is formed in two portions which are arranged to abut axially, and the at least one lobe is arranged to run in a trough formed between the portions.

8. A gearbox as claimed in claim 1 wherein the ring gear is stationary.

9. A gearbox as claimed in claim 1 wherein
the ring gear precesses in the opposite sense to the planet carrier.

10. A gearbox as claimed in claim 1 wherein
the ejection apertures are profiled to have cross-section that is one of the group comprising circular, square, elongate, triangular and trapezoidal.

11. A gearbox as claimed in claim 10 wherein
corners of the ejection apertures are radiused.

12. A gearbox as claimed in claim 1 wherein
there are at least three planet gears.

13. A gearbox as claimed in claim 1 wherein
the number of lobes is equal to the number of planet gears.

14. A gearbox as claimed in claim 1 wherein
the planet carrier is coupled to an output shaft.

15. A gearbox as claimed in claim 14 wherein
the ring gear is coupled to a second output shaft.

16. A gas turbine engine comprising a gearbox as claimed in claim 1.

17. A propeller gas turbine engine comprising a gearbox as claimed in claim 1.

* * * * *